United States Patent
Schulz et al.

(10) Patent No.: US 6,924,617 B2
(45) Date of Patent: Aug. 2, 2005

(54) POSITION SENSORLESS CONTROL ALGORITHM FOR AC MACHINE

(75) Inventors: Steven E. Schulz, Torrance, CA (US); Nitinkumar R. Patel, Cypress, CA (US); James M. Nagashima, Cerritos, CA (US); Seung Ki Sul, Seoul (KR); Bon-Ho Bae, Seoul (KR)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/601,726

(22) Filed: Jun. 23, 2003

(65) Prior Publication Data

US 2004/0257028 A1 Dec. 23, 2004

(51) Int. Cl.$^7$ .............................. H02P 1/46; H02P 1/18; G05B 11/42
(52) U.S. Cl. ...................... 318/701; 318/719; 318/721; 318/801; 318/254; 318/138; 318/439; 318/610
(58) Field of Search .................................. 318/701, 715, 318/719, 721, 722, 772, 779, 799, 801, 806, 254, 138, 439, 71, 85, 59, 609, 610

(56) References Cited

U.S. PATENT DOCUMENTS

| | | | | |
|---|---|---|---|---|
| 5,115,418 A | * | 5/1992 | Shimada | 318/616 |
| 5,525,877 A | * | 6/1996 | Umida | 318/432 |
| 6,008,618 A | * | 12/1999 | Bose et al. | 318/811 |
| 6,137,258 A | * | 10/2000 | Jansen | 318/802 |
| 6,163,127 A | * | 12/2000 | Patel et al. | 318/700 |
| 6,696,812 B2 | * | 2/2004 | Kaneko et al. | 318/700 |
| 6,724,168 B2 | * | 4/2004 | Cheong et al. | 318/701 |
| 6,763,622 B2 | * | 7/2004 | Schulz et al. | 318/700 |
| 2004/0070362 A1 | * | 4/2004 | Patel et al. | 318/701 |

FOREIGN PATENT DOCUMENTS

| | | | | |
|---|---|---|---|---|
| JP | 11299293 A | * | 10/1999 | ............. H02P/8/22 |
| JP | 2003033096 A | * | 1/2003 | ........... H02P/21/00 |
| JP | 2004135494 A | * | 4/2004 | ........... H02P/21/00 |

* cited by examiner

*Primary Examiner*—Edgardo San Martin
(74) *Attorney, Agent, or Firm*—Christopher DeVries

(57) ABSTRACT

A control system for an electric motor having a stator and rotor including an inverter for providing power to the electric motor, a controller for controlling the inverter, a low speed control block to estimate the rotor angular position using stator current components operating in the controller, a high speed control block to estimate the rotor angular position using stator current components and stator flux position operating in the controller, a transition switch in the controller to vary operation between the low speed control block and the high speed control block, and where the inverter is controlled by six step operation.

18 Claims, 3 Drawing Sheets

POSITION SENSORLESS CONTROL ALGORITHM FOR AC MACHINE

TECHNICAL FIELD

The present invention relates to the control of electric motors. More specifically, the present invention relates to a method and apparatus for position sensorless control of an electric motor.

BACKGROUND OF THE INVENTION

Traditional motor control systems normally include a feedback device or position sensor such as a resolver or encoder to provide speed and position information for a motor. Feedback devices and associated interface circuits increase the costs of a motor control system, and these costs may become prohibitive in high volume applications such as automotive applications. Additionally, a position sensor and its associated wiring harness increase the complexity and assembly time of an electric drive system in a vehicle.

Electric vehicles powered by fuel cells, batteries and hybrid systems that include electric motors are becoming more common in the automotive market. As production volumes for electric vehicles increase, the cost of feedback devices and associated interface circuits will become significant. Automakers are under intense market pressure to cut costs and reduce the number of parts for a vehicle. The removal of a feedback device for an electric motor control system will lead to significant cost reductions for an electric vehicle.

Hybrid electric and electric vehicles today utilize numerous electric motor control technologies such as the vector control of electric motors. A vector motor control scheme is a computationally intensive motor control scheme that maps the phase voltages/currents of a three-phase motor into a two-axis coordinate system. The structure used to excite an electric motor using a vector control scheme is a typical three-phase power source inverter including six power transistors that shape the output voltage to an electric motor. Vector control requires rotor position information, which is normally obtained via a feedback device or position sensor. The objective of the position sensorless control is to obtain the rotor position information utilizing electromagnetic characteristics of an AC machine, eliminating the position sensor and its associated interface circuits.

SUMMARY OF THE INVENTION

The present invention is a method and apparatus for a sensorless control system used in electric and hybrid electric vehicle powertrain applications. The sensorless motor control system of the present invention includes a low-speed angular position estimation method, an initial rotor polarity detection method, a transition algorithm between low and high speed methods, a modified Gopinath observer, a field weakening method, and/or six step operation.

DESCRIPTION OF THE PREFERRED EMBODIMENT

Figure 1:
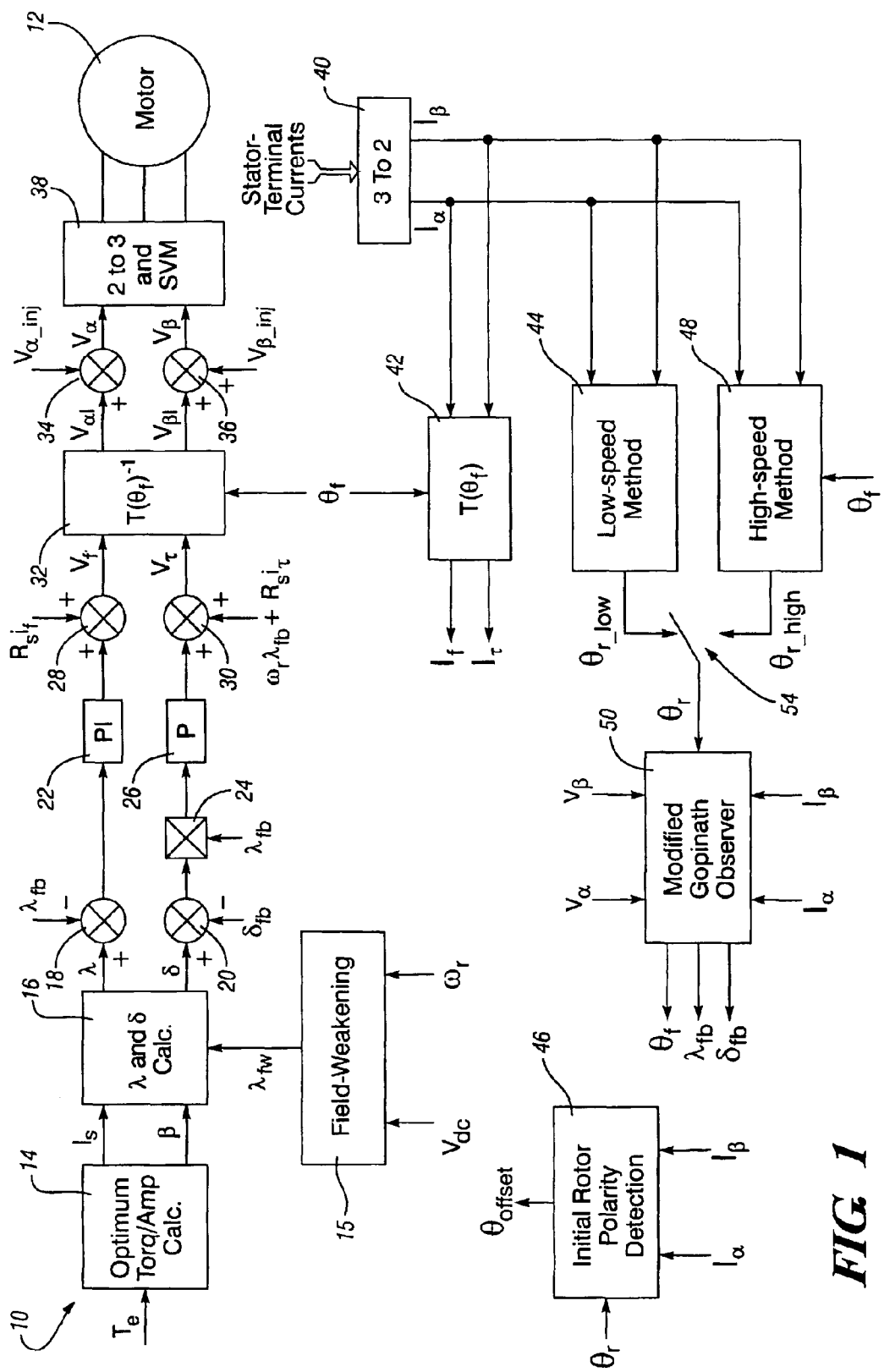
FIG. 1 is a block diagram of a control system in the present invention.

FIG. 1 is a diagrammatic drawing of a preferred embodiment of a control system 10 of the present invention. The control system 10 is illustrated as a sequence of block diagrams that represent software executed in a controller, microprocessor, or similar device to control an electric motor 12. In the preferred embodiment of the present invention, the controller is a vehicle powertrain controller controlling the electric motor 12, but any other motor control application is considered within the scope of the present invention. The electric motor may comprise motor technologies such as AC machines, synchronous reluctance motors, induction motors and interior permanent magnet motors, but is not limited to such. The input to the control system is a torque command $T_e$ generated by the vehicle controller. The torque command $T_e$ is processed by a optimum torque/amperage calculation block 14 to generate a corresponding stator current command $I_s$ and current angle command $\beta$ required to develop the desired electromagnetic torque in the motor 12. A field weakening stator flux $\lambda_{fw}$ is generated at field weakening block 15 based on the measured DC link voltage $V_{dc}$ and rotor angular velocity $\omega_r$. Block 16 will modify the commands $\lambda$ and $\delta$ if the stator flux command $\lambda$ exceeds the field weakening stator flux command $\lambda_{fw}$.

The stator current command $I_s$ and current angle command $\beta$ generated at bock 14 are passed to a stator flux and torque angle calculation block 16. Block 16 processes the commanded stator current $I_s$ and current angle command $\beta$ and decomposes it into the stator flux command $\lambda$ and torque angle command $\delta$ to provide the maximum torque for the given stator current amplitude.

Summing junction 18 subtract the feedback stator flux $\lambda_{fb}$ from the stator flux command $\lambda$ to generate an error. Summing junction 20 subtracts the feedback torque angle $\delta_{fb}$ from the torque angle command $\delta_{fb}$ to generate an error. The error generated by summing junction 18 is processed by Proportional Integral (PI) control block 22 to generate a control output. The error generated by summing junction 20 is processed at multiplication block 24 where it is multiplied by the feedback stator flux $\lambda_{fb}$. The output of block 24 is processed at proportional control block 26.

The output of PI control block 22 is summed at summing junction 28 with the stator resistance voltage drop decoupling term $R_s I_f$ to produce the f-axis voltage command $V_f$. The output of proportional control block 26 is summed at summing junction 30 with the τ-axis decoupling term (stator resistance voltage drop plus speed voltage) $\omega_r \lambda_{fb} + R_s i_\tau$ to produce the τ-axis voltage coomand $V_\tau$. $V_f$ and $V_\tau$ are processed at the rotating to stationary frame transformation block 32 using the estimated stator flux angular position $\theta_f$ to convert the stator flux reference frame voltage commands $V_f$ and $V_\tau$ to the stationary frame voltage commands $V_{\alpha 1}$ and $V_{\beta 1}$. High frequency injection signals $V_{\alpha\_inj}$ and $V_{\beta\_inj}$ are added at summing junctions 34 and 36 to the stationary frame voltage commands $V_{\alpha 1}$ and $V_{\beta 1}$ to produce final voltage commands $V_\alpha$ and $V_\beta$ that generate the actual phase voltage commands applied to the electric motor 12. The voltage source inverter 38 processes the final voltage commands $V_\alpha$ and $V_\beta$ using a two-phase to three-phase transformation to generate the actual three-phase voltages to be applied to the motor 12.

The phase currents are measured and processed by a three-phase to two-phase transformation block 40. The outputs of the block 40 are stationary frame currents $I_\alpha$ and $I_\beta$. A stationary to rotating frame transformation block 42 uses the stationary frame currents $I_\alpha$ and $I_\beta$ and the estimated rotor angular position $\theta_f$ to generate stator flux reference frame feedback currents $I_f$ and $I_\tau$.

The present invention further includes position sensorless control of the machine that includes: a low speed rotor angular position estimation method/observer at block 44; an initial rotor polarity detection method at block 46; a high speed rotor angular position estimation method/observer at block 48; a modified Gopinath observer block 50; and a transition switch 54 to seamlessly merge the low and high speed estimation methods.

Block 44 of FIG. 1 represents the low speed estimation method of the present invention. The low speed method 44 uses stationary reference frame stator current components $I_\alpha$ and $I_\beta$ to estimate the rotor angular position $\theta_{r\_low}$. Similarly, the high speed method 48 uses stationary reference frame stator current components $I_\alpha$ and $I_\beta$ and estimated stator flux position $\theta_f$ to estimate the rotor angular position $\theta_{r\_high}$. The switch 54 selects appropriate rotor angular position $\theta_r$ based upon estimated rotor speed.

The modified Gopinath observer 50 processes $\theta_r$, the stationary frame voltages $V_\alpha$ and $V_\beta$, and stationary reference frame currents $I_\alpha$ and $I_\beta$. The modified Gopinath observer 50 computes the estimated stator flux angle $\theta_f$, the feedback stator flux $\lambda_{fb}$, and the feedback torque angle flux $\delta_{fb}$.

Figure 2:
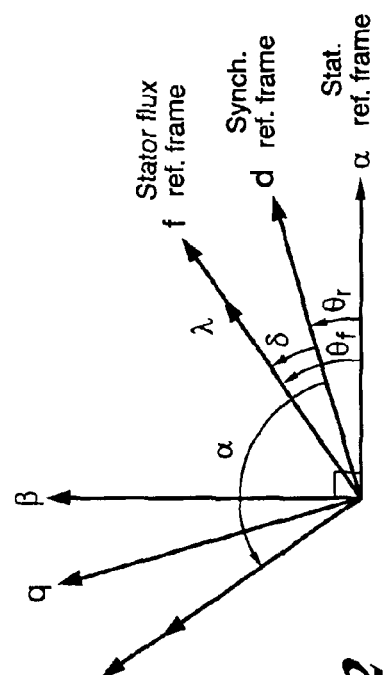
FIG. 2 is a vector diagram illustrating possible orientation frames for control of the present invention.

In the preferred embodiment of the present invention, the d-axis inductance will be higher than the q-axis inductance, and the machine magnet north pole is oriented in the (−) q-axis direction. However, the proposed control scheme will still be valid if the machine q-axis inductance is higher than the d-axis inductance. FIG. 2 is a vector diagram showing possible orientation frames for control. The $\alpha$ and $\beta$ axes are used for the stationary reference frame control. In the stationary reference frame control variables are the AC time varying signals. It is preferable to use a rotating reference frame for control, where the control variables are DC quantities. The synchronous reference frame (rotor-oriented reference frame, or d-q frame) and the stator flux reference frame (f-$\tau$ reference frame) are both rotating reference frames with DC control variables in steady state.

For a highly saturated machine, the d-q frame voltage equations have bi-directional cross coupling terms, which can limit synchronous current controller bandwidth. Equation (1) below shows the stator voltage equations in the d-q reference frame illustrating the cross-coupling effects.

$$v_{ds}^e = r_s i_{ds}^e + L_d' \frac{d i_{ds}^e}{dt} + i_{ds}^e \frac{\partial L_d}{\partial i_{qs}^e} \frac{d i_{qs}^e}{dt} - \omega_r \lambda_{qs}^e \quad (1)$$

$$v_{qs}^e = r_s i_{qs}^e + L_q' \frac{d i_{qs}^e}{dt} + i_{qs}^e \frac{\partial L_q}{\partial i_{ds}^e} \frac{d i_{ds}^e}{dt} + \omega_r \lambda_{ds}^e$$

In Equation (1), the last two terms in each voltage equation are cross-coupling terms. Since the d-axis inductance is much larger than the q-axis inductance, the time constant in the d-axis is much longer than that in the q-axis. Any disturbance introduced into the d-axis voltage equation due to the cross-coupling terms will have minimal effect on the d-axis current regulation due to the long time constant. However, the disturbance introduced by the cross-coupling terms into the q-axis voltage equation will have a significant effect on the q-axis current regulation. As a result, attempting to increase the current regulator bandwidth will result in unstable operation. To overcome these limitations, it is desirable to change the controller reference frame to the stator flux reference frame (f-$\tau$ reference frame). The machine equations in the stator flux reference frame can be described as shown in Equations (2) and (3) below:

$$\frac{d\lambda}{dt} = v_f - r_s i_f \quad (2)$$

$$\lambda \frac{d\delta}{dt} = v_\tau - r_s i_\tau - \omega_r \lambda \quad (3)$$

From Equation (2), it can be seen there is no cross-coupling from the $\tau$ axis into the f-axis. However, there is uni-directional coupling from the f-axis into the $\tau$-axis. The uni-directional cross-coupling is easy to decouple in the control. For the above reasons, it can be seen that the stator flux oriented control is more suited for this type of machine compared to the rotor flux oriented control.

Figure 3:
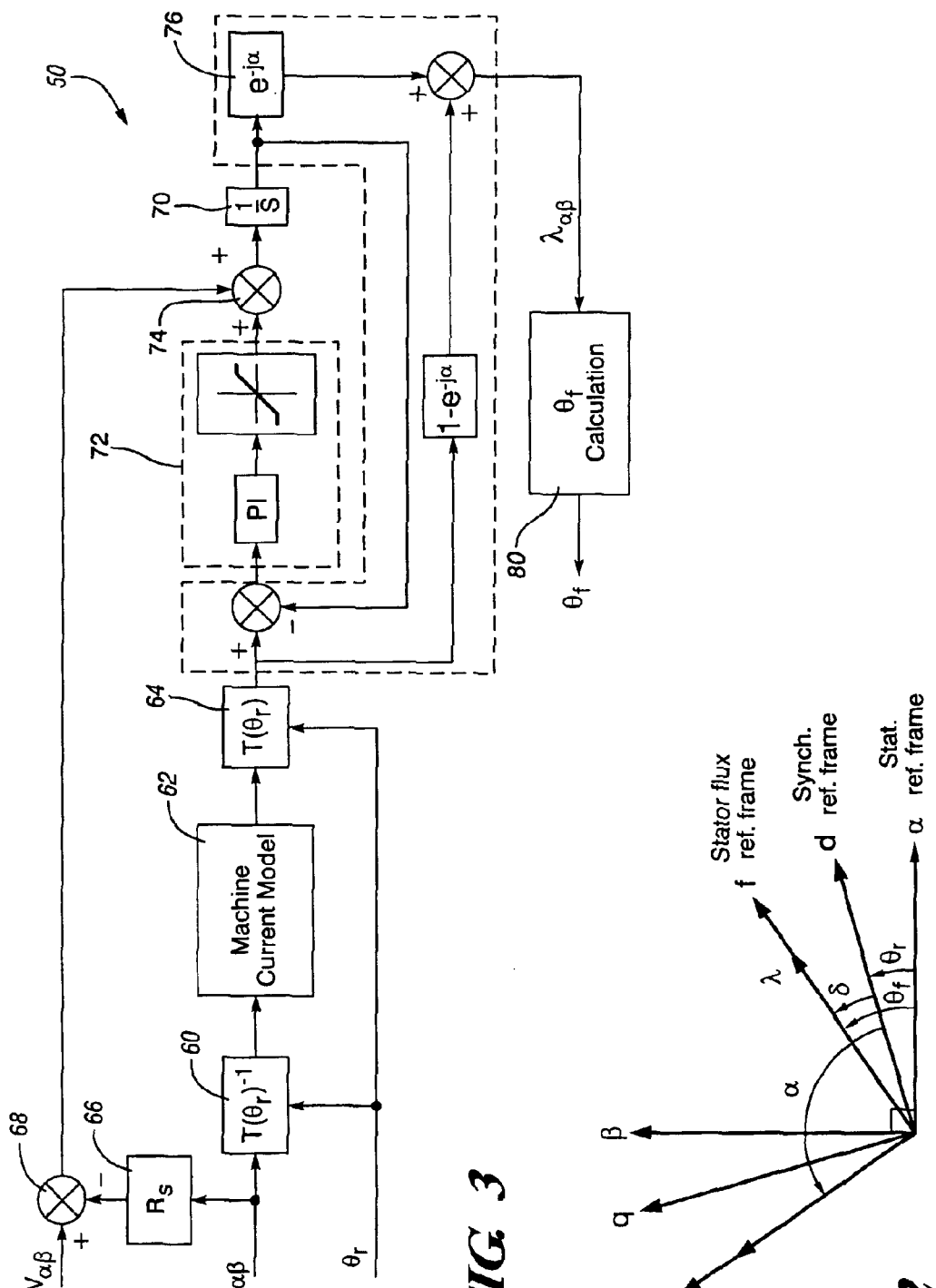
FIG. 3 is a block diagram of a modified Gopinath observer used in the present invention.

The modified Gopinath observer 50 shown in FIG. 3 is used to estimate the stator flux angle $\theta_f$, the feedback stator flux $\lambda_{fb}$, and the feedback torque angle $\delta_{fb}$. The stationary frame currents $I_\alpha$ and $I_\beta$ are input to the observer. Stationary to synchronous reference frame transformation module 60 transforms the stationary frame currents to the synchronous reference frame using rotor angular position $\theta_r$. The machine current model 62 calculates the stator flux of the machine in the synchronous reference frame. Synchronous to stationary reference frame transformation module 64 transforms the synchronous frame stator flux to the stationary reference frame using rotor angular position $\theta_r$.

Stator resistance gain module 66 and summer 68 are used along with the stationary reference frame voltages $V_\alpha$ and $V_\beta$ and currents $I_\alpha$ and $I_\beta$ to calculate the stationary frame back EMF. The integrator 70 is used to integrate the back EMF to calculate the stator flux based upon the voltage model.

The current model is more accurate at lower speeds, while the voltage model based calculation is more accurate at higher speeds. Therefore, blocks 72, 74, and 76 are used to smoothly transition the stator flux calculation from current model to voltage model based upon rotor speed. Equation (4) describes how blocks 72, 74, and 76 result in smooth transition between the current model flux estimate $\lambda_{\alpha\beta-CM}$ and the voltage model flux estimate $\lambda_{\alpha\beta-VM}$ as a function of the electrical frequency $\omega_e$. The observer characteristic function F(s) is also shown in Equation (4). The setting of module 72 PI gains is shown in Equation (5). Block 76 assures optimal transition trajectory between the current model and voltage model estimated stator flux vectors. Module 80 is used to calculate the stator flux angular position Of using an arctangent function.

$$\lambda_{\alpha\beta} = F(s) \cdot \lambda_{\alpha\beta-VM} + [1 - F(s)] \cdot \lambda_{\alpha\beta-CM} \quad (4)$$

$$F(s) = \frac{s^2}{s^2 + K_p s + K_i} \cdot e^{-j\alpha}$$

$$\alpha = \pi - \tan^{-1}\left(\frac{K_p \omega_e}{K_i - \omega_e^2}\right)$$

where $K_p \sqrt{2} \cdot \omega_c$ $K_i = \omega_c^2 + tm$ (5)

$\omega_c$=transition frequency

The modified Gopinath observer 50 is used to estimate the stator flux angle $\theta_f$ at all speeds. The appropriate input $\theta_r$ is automatically selected by the transition switch 54 depending on the rotor speed.

Field-weakening operation is achieved utilizing module 15. Equation (6) is used to calculate the field-weakening stator flux command based upon DC link voltage and rotor speed.

$$\lambda_{fw} = \frac{V_{DC} \cdot K_{fw}}{\sqrt{3}\,\omega_r} \quad (6)$$

Under all operating conditions $\lambda_{fw}$ is being compared to $\lambda$. The lower flux command is used by the controller as the final flux reference. If the field-weakening stator flux command $\lambda_{fw}$ is selected, then command calculation module 16 recalculates optimum torque angle command $\delta$ based upon the new flux command $\lambda_{fw}$ and torque command $T_e$.

Figure 4:
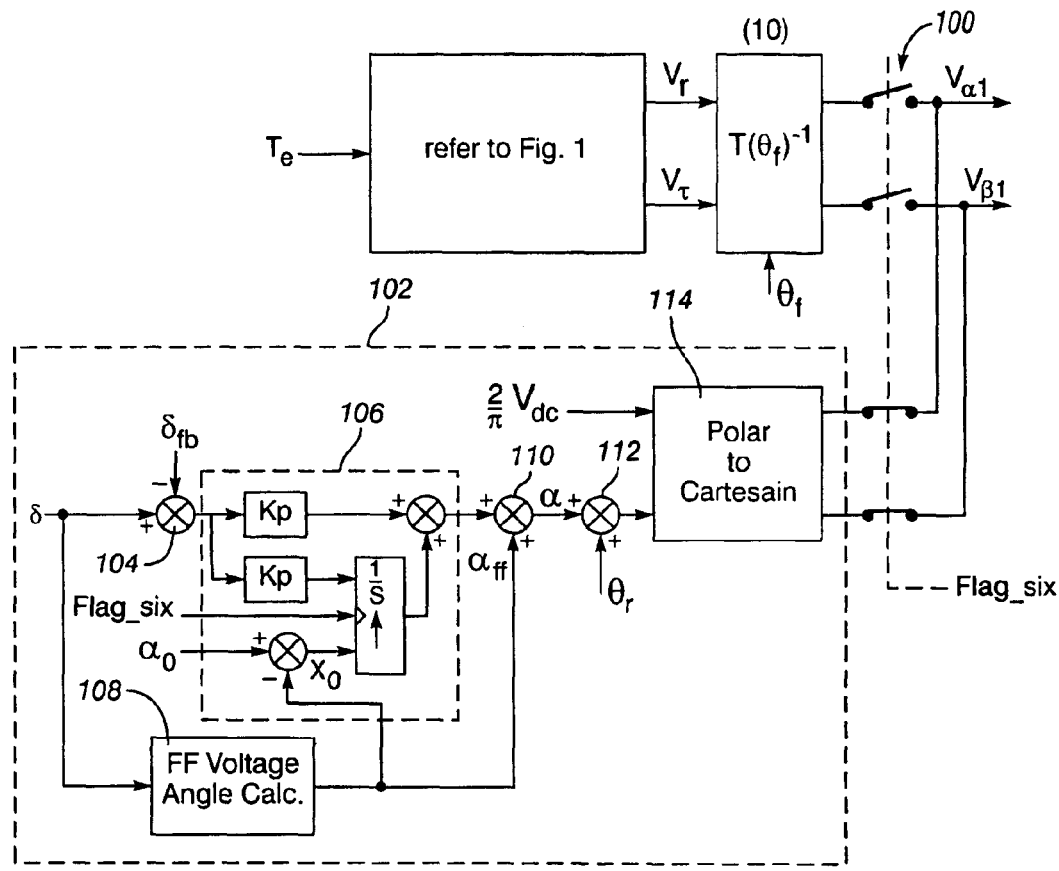
FIG. 4 is a block diagram of a controller used for six step operation in the present invention.
Figure 5:
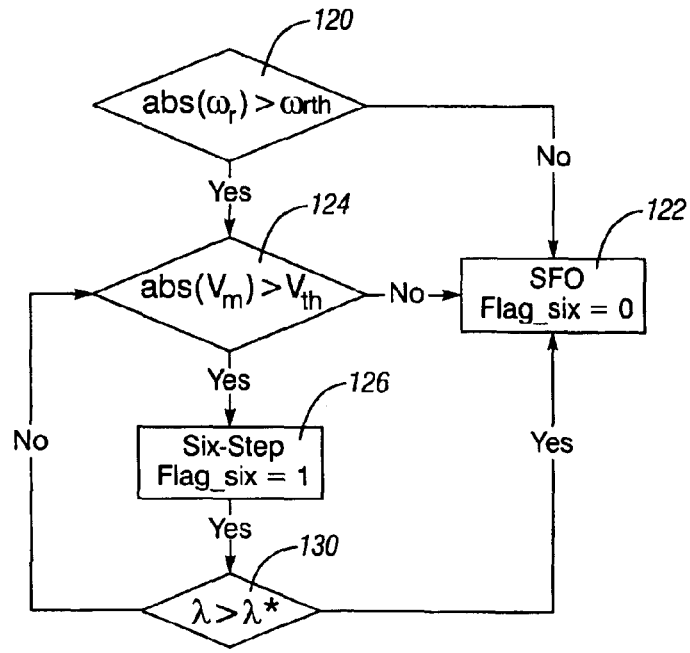
FIG. 5 is a state flow diagram for transition into and out of six step operation.

The diagram shown in FIG. 4 illustrates the proposed control that allows for torque regulation during six-step operation. During six-step operation, the voltage applied to the stator is fixed. Hence, there is only one degree of freedom in the controller. Torque is controlled by regulating the torque angle $\delta$, which in turn controls the voltage angle $\alpha$ with respect to the d-axis of the synchronous reference frame. FIG. 5 shows a state flow diagram that describes the transition into and out of six-step operation.

Referring to FIG. 4, the switch 100 transitions between normal operation and six-step operation. During normal operation, the diagram in FIG. 1 generates the stationary frame voltage commands $V_{\alpha 1}$ and $V_{\beta 1}$. When the variable Flag__six becomes true, the voltage commands $V_{\alpha 1}$ and $V_{\beta 1}$ are supplied by the six-step control module 102.

The six-step control module 102 regulates the torque angle $\delta$, which in turn controls the voltage angle applied to the machine. Torque angle command $\delta$ is compared to torque angle feedback $\delta_{fb}$ using summing junction 104, whose output is fed to PI regulator 106. The PI regulator initial state is set to provide seamless transition into and out of six-step operation. The feedforward voltage angle calculation module 108 calculates the feedforward voltage angle $\alpha_{ff}$ for faster dynamic performance. The summer 110 adds the PI regulator output and the feedforward voltage angle $\alpha_{ff}$ to generate the final voltage angle $\alpha$. The voltage angle $\alpha$ is added to the rotor angular position $\theta_r$ using summing junction 112 to produce the stationary frame voltage angle. Block 114 utilizes the output of summing junction 112 and the maximum available voltage (six-step voltage) to generate the command voltages $V_{\alpha 1}$ and $V_{\beta 1}$.

FIG. 5 details the state flow diagram describing the setting of transition flag Flag__six in FIG. 4. The entire flow diagram is executed every sample period. Decision block 120 compares the actual rotor speed $\omega_r$ with a predefined minimum threshold speed $\omega_{rth}$. If the rotor speed is less than the predefined minimum threshold speed, Flag__six is set to zero (normal stator flux oriented control described in FIG. 1) at block 122. Otherwise, decision block 124 is used to compare the applied stator voltage $V_m$ to a predefined maximum threshold voltage $V_{th}$. If the applied stator voltage is less than the $V_{th}$, then Flag__six is set to zero at block 122. Otherwise, Flag__six is set to 1 (six-step operation) at block 126. The control remains in this mode of operation until the condition of decision block 130 is evaluated true. Block 130 detects the condition where the estimated stator flux exceeds the commanded stator flux. If TRUE, there is sufficient voltage available to exit six-step operation and return to normal stator flux oriented control.

It is to be understood that the invention is not limited to the exact construction illustrated and described above, but that various changes and modifications may be made without departing from the spirit and scope of the invention as defined in the following claims.

What is claimed is:

1. A control system for an electric motor having a stator and rotor comprising:
    an inverter for providing power to the electric motor;
    a controller for controlling said inverter;
    a low speed control block to estimate the rotor angular position using stator current components operating in said controller;
    a high speed control block to estimate the rotor angular position using stator current components and stator flux position operating in said controller;
    a transition switch in said controller to vary operation between said low speed control block and said high speed control block; and
    wherein said inverter is controlled by six step operation.

2. The control system of claim 1 wherein said electric motor is an induction motor.

3. The control system of claim 1 wherein said electric motor is an interior permanent magnet motor.

4. The control system of claim 1 wherein said electric motor is a synchronous reluctance motor.

5. The control system of claim 1 wherein said electric motor is a three-phase motor.

6. The control system of claim 1 further comprising a Gopinath observer.

7. The control system of claim 1 wherein said transition switch operates said first motor speed control block below ten percent of rated machine speed.

8. The control system of claim 1 wherein said transition switch operates said second motor speed control block above five percent of rated machine speed.

9. A sensorless method of controlling an electric motor comprising:
    providing a low speed rotor angular position block operating in a controller;
    providing a high speed rotor angular position block operating in said controller;
    providing an initial rotor polarity detection block operating in said controller;
    transitioning between said low speed rotor angular position block and said high speed rotor angular position block to determine the speed of the electric motor; and
    controlling the speed of the electric motor with six step operation.

10. The method of claim 9 further comprising operating the electric motor in a vehicle.

11. The method of claim 9 further comprising the step of determining the rotor magnet position of the electric motor in a static state.

12. A powertrain for a vehicle comprising:
    an electric motor functionally coupled to a wheel of the vehicle;
    an inverter for providing power to the electric motor;
    a controller for controlling said inverter;
    a low speed control block to estimate the rotor angular position using stator current components operating in said controller;
    a high speed control block to estimate the rotor angular position using stator current components and stator flux position operating in said controller;
    a transition switch in said controller to vary operation between said low speed control block and said second high speed control block; and
    wherein said inverter is controlled by six step operation.

13. The powertrain of claim 12 wherein said electric motor is an induction motor.

14. The powertrain of claim 12 wherein said electric motor is an interior permanent magnet motor.

15. The powertrain of claim 12 wherein said electric motor is a synchronous reluctance motor.

16. The powertrain of claim 12 wherein said electric motor is a three-phase motor.

17. The powertrain of claim 12 wherein said transition module varies operation between said first control module and said second control module based on the speed of the electric motor.

18. The powertrain of claim 12 wherein the electric motor includes an interior permanent magnet rotor.

* * * * *